United States Patent [19]
Rolf et al.

[11] Patent Number: 5,555,536
[45] Date of Patent: Sep. 10, 1996

[54] DEVICE FOR PLAYING RECORDED AUDIO AT A SELECTED TIME

[76] Inventors: Rebecca L. Rolf; Devon A. Rolf, both of 4428 NW. Briarcliff La., Gladstone, Mo. 64116

[21] Appl. No.: 277,522

[22] Filed: Jul. 19, 1994

[51] Int. Cl.$^6$ .................................................. G11B 31/00
[52] U.S. Cl. ........................ 369/19; 340/307.15; 368/98
[58] Field of Search ................................. 369/19, 20, 21, 369/22, 23, 6, 7; 455/181.1, 231; 368/63, 98, 99, 272, 274; 340/309.15, 309.4; 360/12, 5

[56] References Cited

U.S. PATENT DOCUMENTS

| | | | |
|---|---|---|---|
| 3,611,151 | 10/1971 | Fernandez | 369/6 |
| 3,877,363 | 4/1975 | Parilla | 369/23 |
| 3,919,834 | 11/1975 | Murakami et al. | 369/20 |
| 4,101,742 | 7/1978 | Craig et al. | 369/22 |
| 4,302,752 | 11/1981 | Weitzler | 340/309.15 |
| 4,460,928 | 7/1984 | Kishimoto | 360/4 |
| 4,814,905 | 3/1989 | Hashimoto | 369/19 |
| 5,195,064 | 3/1993 | Hegarty et al. | 368/274 |

FOREIGN PATENT DOCUMENTS 2190535  11/1987  United Kingdom ................. 369/7

Primary Examiner—Tan Dinh

[57] ABSTRACT

A device for playing recorded audio at one or more selected times. An alarm clock and recorder are coupled together such that audio recorded by the user plays at a time selected by the user on the clock. The device permits multiple times to be selected. In one mode of operation, all recorded audio (such as messages) is played at each selected time. In another mode of operation, audio portions, such as individual messages, are associated with individual times, and each audio portion plays only at its associated, selected time. In yet another mode of operation, a time interval may be selected whereby, after initial playback of audio, the audio is replayed each time the interval of time passes.

12 Claims, 4 Drawing Sheets

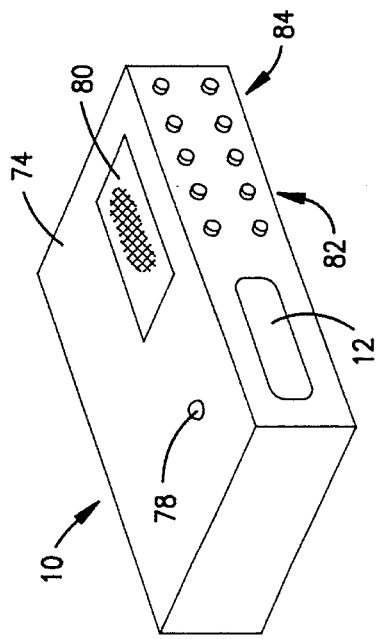
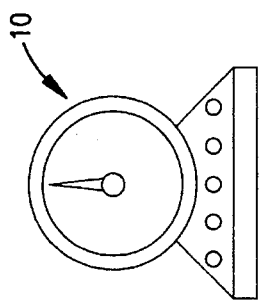
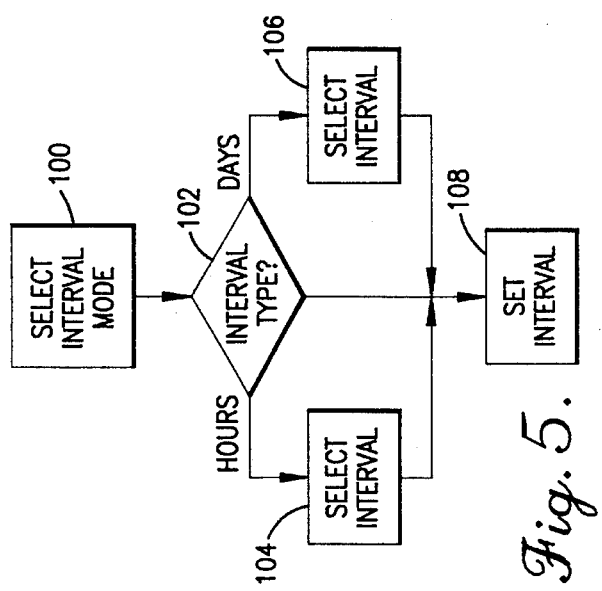
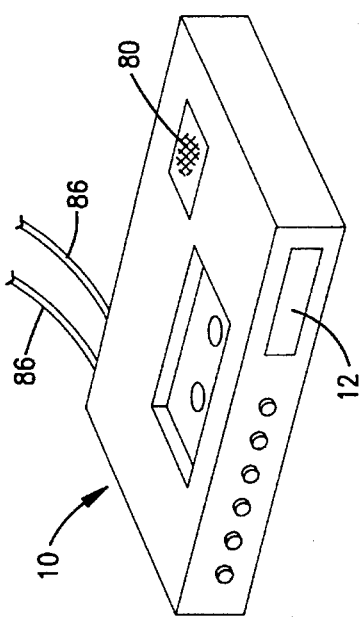
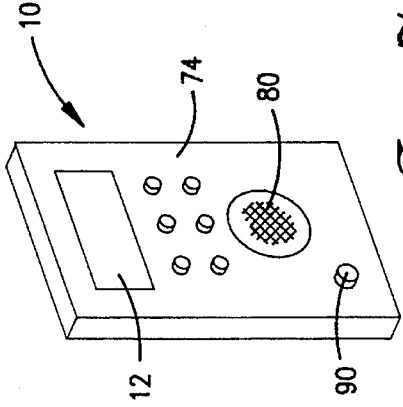

DEVICE FOR PLAYING RECORDED AUDIO AT A SELECTED TIME

BACKGROUND OF THE INVENTION

1. Field of the Invention

The present invention is directed generally to a device for outputting one or more recorded message(s) at one or more preselected time(s). More specifically, the present invention is directed to a device, such as an alarm clock, timer, recorder, telephone answering machine, etc., which permits the user thereof to record and edit audio, such as audible messages and tones, which audio will be played when a clock reaches a desired, preset time or when a selected amount of time has passed on a timer.

2. Description of the Related Art

Traditional alarm clocks for sounding an alarm when a set time arrives are well-known and have long been utilized for waking people from sleep. Numerous sound generating devices have been utilized with alarm clocks, such as bells, buzzers, and the like. Some alarm clocks may be set to turn on an accompanying radio at a preselected time. However, none of these alarm clocks provide the ability for a user to record, store or edit one or more audible messages to be emitted when the alarm is to sound.

Additionally, timers for indicating when a set amount of time has elapsed have commonly been used in domestic applications. For instance, during cooking and preparation of food, timers traditionally are set to a preselected amount of time, and when the time elapses, an audible tone or bell sounds to indicate to the user that the set amount of time has elapsed. However, as with traditional alarm clocks, these domestic timers do not provide the ability to store and edit audio, such as a vocal message, which is played when a set amount of time has passed.

Similarly, recorders, such as tape recorders and microcassette recorders, are commonly used for recording messages, dictation, conversations, and other sounds. Recent advancements have made it possible to utilize digital technology in the place of cassettes to store voice data and other audio data. In this regard, digital products for assisting a user in organizing and planning are currently available which permit messages to be recorded and recalled upon command or activation by the user. However, although such recorders permit the stored messages or other sounds to be played back when activated by the user, such recorders do not have the ability to play back recorded messages at one or more preselected times.

Similarly, telephone answering machines are useful for recording messages of callers when the intended recipient of the call is unable to take the call. Although recorded messages may be played back, prior answering machines do not permit users to select one or more times at which the messages will be automatically played back.

In view of the foregoing, the need exists for a device having the components and ability to store audio, such as one or more audible messages, which audio will be played at one or more preselected times. For instance, with an alarm clock having such a feature, a person setting the alarm clock prior to going to sleep could fashion the sound to which he or she will be awakened. Similarly, vocal messages, perhaps pertaining to the next day's agenda, could be stored. When the preset time for the alarm to sound arrives, the vocal messages would be automatically played thereby reminding the user of the day's agenda. Similarly, virtually any audible message desired to be heard when the alarm sounds (such as "HAPPY BIRTHDAY", etc.) could be stored. Moreover, such a device would be highly advantageous to persons who think of something that they wish to remember later, since the message could be stored and reheard when the alarm sounds. Additionally, the need exists for such a device which permits stored messages to be edited and erased, and which permits the messages to played not only when the alarm is to sound, but upon activation by the user, such as for instance, by pressing an appropriate button.

Similarly, the need exists for a timer having such capabilities. With such a timer, various steps of a recipe (for instance), required to be performed at different times, could be vocally stored into the timer (or onto a tape useable therein) in a manner such that the first message would be heard after lapse of a first time period, a second message (if necessary) would be heard after lapse of a second time period, and so on, thereby reminding the cook of the next sequence of events necessary to complete the recipe.

Further, the need exists for a telephone answering machine having the ability to play recorded messages at one or more preselected times. For instance, such a device could permit incoming phone messages to be silently recorded—for instance while the user is sleeping—, or recorded at a location remote from the sleeping individual. At a preselected time, presumably at the time the individual desires to awake, the messages could be automatically played at a volume to be heard by the user. Such a device would prevent delay in receiving messages.

Additionally, the need exists for a recorder having components permitting one or more messages to be stored and played back at preselected times, as set by a clock or timer associated with the recorder. The need further exists for such devices to have a mode of operation whereby a first recorded message will play at a first preselected time, a second recorded message will play at a second preselected time, and any subsequent recorded messages will play at other, associated preselected times.

The present invention overcomes the drawbacks of previous devices, such as alarm clocks, timers, answering machines, and recorders, and fills the foregoing needs, as well as other needs.

SUMMARY OF THE INVENTION

It is a general object of the present invention to provide a device which is adapted to store audio, such as one or more audio messages, and which permits the user thereof to select one or more times at which the stored audio is to be played.

It is an object of the present invention to provide an alarm clock which permits the user thereof to store and edit messages.

It is an object of the present invention to provide an alarm clock having components for storing messages to be played one or more times at the selected time of the alarm.

It is an object of the present invention to provide an alarm clock which plays audible messages, stored therein by the user of the alarm clock, at the time of the alarm or whenever desired.

It is a further object of the present invention to provide a timer having components for storing messages to be played after passage of a selected time.

It is a further object of the present invention to provide a timer which assists a cook in remembering and carrying out steps of a recipe.

It is a further object of the present invention to provide a timer which permits the user thereof to store and edit messages.

It is yet another embodiment of the present invention to provide a device which permits storage of messages for playback at selected intervals, such as for instance, once a week, twice a week, etc.

It is yet another object of the present invention to provide a recorder, having a timer or clock, which recorder plays back one or more recorded messages at one or more preselected times.

It is another object of the present invention to provide a telephone answering machine, having or associated with a timer or clock, which answering machine plays back recorded messages at one or more preselected times.

These and other objects are achieved by a device having a clock or timer for keeping time and a recorder for storing audio. The device permits a user to record audio, such as one or more messages, and thereby store the audio for later playback. Editing functions permit the recorded messages to be modified or erased. A first mode of operation permits the user, using the clock or timer, to select one or more times at which the recorded audio is desired to be played. Each time a selected time arrives, the entirety of the recorded audio is played through a speaker, in the absence of deactivation of the device by the user during playback.

A second mode of operation permits the user to associate each of a number of audio portions with a separate playback time. For instance, a first recorded audio message is associated with a first selected time for playback, a second recorded audio message is associated with a second selected time for playback, and so on. Although numerous uses will be recognized, such a mode of operation is useful, for example, to remind the user, at perhaps ten minutes before noon, of a luncheon to be attended; to remind the user at 3:00 pm of a meeting, etc. The device of the present invention may also comprise, in addition to a clock, an electronic calendar which permits the user to store a message in association with a preselected time, which time is more than 24 hours in the future.

In a variation of the second mode of operation, the device of the present invention permits the user to store a message for playback at selected intervals. In this interval mode, and in accordance with the components and principles of the present invention relating to the ability of the user to select one or more times at which a message is to play, the present invention provides the ability to play a recorded message at a selected interval.

For example, if a user's rent payment is due every Monday, a message could be recorded such as "Don't forget to pay the rent today", and the message would play each Monday at a selected time. In this way, messages to be remembered on a particular interval, such as every other day, once a week, etc. will be timely replayed.

In the various embodiments of the present invention, a clock mechanism or timer is provided for keeping and indicating time, or the passage of time. Components are provided for setting one or more times on the clock mechanism or timer for indicating when each set time arrives, or for generating a signal when each set time arrives. A device for storing and editing audible messages, such as a digital storage device or a tape, is provided. Recorded messages are played through a speaker when the clock or timer is properly set and reaches the set time. Any audio may be recorded. For instance, one or more messages may be stored in the device. These messages may also be played back when desired without setting the clock or timer and waiting for it to reach the set time.

In one embodiment, the present invention is incorporated into a traditional alarm clock such that one or more recorded messages or tones may be played at the time an alarm is to sound (e.g., when awakened by the alarm clock). In the first mode of operation, all recorded messages are played. The second mode of operation, described briefly above, is useful for storing a first "wake-up message" at a first selected time, and a second "wake-up" message at a second selected time. In this way, stored audio messages desired (or not necessarily desired) to be heard when awakening or at a preset time are played at one or more times at which the alarm is to sound.

In another embodiment, the device is provided in a timer having components for storing and editing audio. The timer may be set to allow a selected amount of time to pass. Upon passage of the set time, the stored audio is played. This device is particularly beneficial for use when preparing a recipe. In another embodiment, the device is part of, or cooperates with, a telephone answering machine. In still another embodiment, the device is provided in a recorder. Such devices are similarly useful for playing back recorded messages at one or more preselected times.

BRIEF DESCRIPTION OF THE DRAWINGS

The objects and features of the invention noted above are explained in more detail with reference to the drawings, in which like reference numerals denote like elements, and in which:

FIGS. 3–5 are flowcharts respectively illustrating a first, second, and third preferred mode of operation of the present invention;

FIGS. 6–9 are perspective view of various devices of the present invention, such as an alarm clock, a recorder, a telephone answering machine, and a timer.

DETAILED DESCRIPTION OF THE INVENTION

Figure 1:
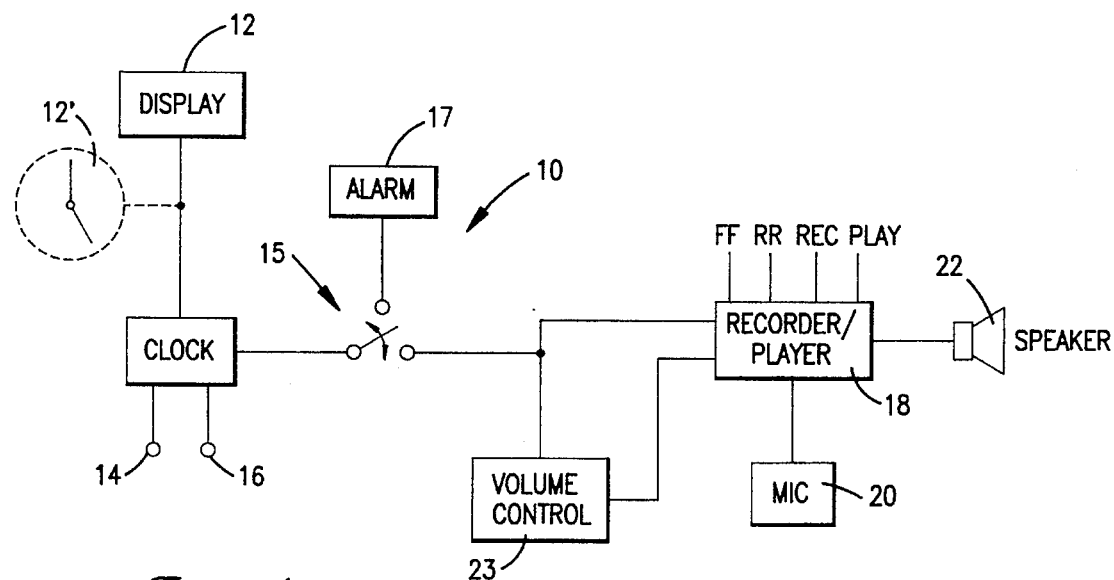
FIG. 1 is a block diagram of a first preferred embodiment of the present invention.

With reference initially to FIG. 1, a block diagram of the present invention is shown. A device of the present invention is generally denoted by reference numeral 10. Device 10 has a clock mechanism 11 for keeping time. Clock mechanism 11 is of a traditional type and may be analogue or digital. An optional display 12, for displaying the current time as indicated by clock mechanism 11, is connected to clock mechanism 11. The display 12 may be of any preferred type. Examples of preferred displays include digital displays, such as a liquid crystal display or displays comprised of light emitting diodes, analogue displays having rotating hands on a face, a number of rotating wheels with numerals printed at various locations around the wheels, or a number of cards having numbers thereon adapted to flip into position as the clock "turns" to a new time. FIG. 1 shows display 12 as preferably comprised of a digital display. A traditional clock display comprised of a face with hands is shown in broken lines for illustration as 12'.

Line 14 on clock mechanism 11 represents means by which a user of the alarm clock may select a time at which an alarm is to occur. Line 16 on clock mechanism 11 represents means for activating (i.e., setting) the device 10 so that the desired alarm does indeed occur at the selected time. Construction and operation of these components 14, 16 will be readily appreciated by those with skill in this art. For instance, on an analogue alarm clock, selecting the time at which an alarm is to occur may be accomplished by positioning an alarm hand at the desired time on the face of the clock. With digital clocks, setting of the time at which an alarm is to occur is typically itself a digital function, whereby the time of the alarm is set by storing that time into a memory associated with the clock.

It will be appreciated that some clocks do not have a face with hands but display the time with actual numbers through use of numbered, rotating wheels or cards to be flipped over as time passes. For instance, at 2:04 pm with such a clock, the first position from the left may be blank, the second position a "2", the third position a "0", and the fourth position a "4". After a minute has passed, the fourth position will rotate to a "5". There are numerous variations of this type of clock as well, and it will be appreciated and understood by those skilled in the art of alarm clocks that setting the time for an alarm to occur with these clocks is accomplished in known fashions, such as by setting the display associated with a desired time (i.e., a selected position of the wheels) to trigger the alarm. The ability to track "am" and "pm" time is also a traditional alarm clock feature and allows a user to set an alarm appropriately.

A storage unit 18 for storing audible messages is adapted for coupling with the clock mechanism 11. Connected to storage unit 18 is a microphone 20 and a speaker 22. A volume controller 23 is adapted for connection between clock 11 and storage unit 18. A switch 15 separates clock 11 from recording components and the volume controller. Storage unit 18 is a means for storing audio. Storage unit 18 may be comprised of either an analogue or digital device. Storage unit 18 may comprise a microcassette tape deck adapted to receive a microcassette tape, such as the type traditionally used in dictation machines or microcassette recorders. It will be appreciated that such devices comprise a tape deck consisting of a bay having two rotatable members. A microcassette may be positioned into the deck such that its spools engage the rotatable members. Standard-sized cassette tape decks and tapes may also be used. Storage unit 18 may also comprise a digital device for storing audible messages.

Storage unit 18 stores messages or sounds dictated or generated by the user. For instance, if unit 18 is a cassette recorder, analogue messages are stored on cassette tape. If unit 18 is a digital storage device, analogue audio signals are digitized and stored. Digital audio tape and recorders are known and within the scope of the present invention. Means for recording messages, means for editing recording messages (including fast forwarding and rewinding through recorded messages, and erasing recorded messages), and means for playing back recorded messages through speaker 22 are provided and are coupled with storage unit 18. Editing buttons, as shown labeled on FIG. 1, include fast forward (FF), reverse rewind (RR), play (PLAY), and record (REC). These functions are well-known functions of traditional recorders, and in this regard, storage unit 18 comprises a recorder for purposes of the present invention.

Speaker 22 is preferably an 8 ohm speaker. It will be appreciated that numerous available types of audio storage devices, microphones, and speakers may be utilized.

The components of the present invention are supplied with electrical power from traditional power sources, such as an AC line voltage or DC voltage. When powered by AC power, device 10 utilizes a power cord for connection with a standard wall outlet. DC voltage, when utilized, is provided from batteries.

Figure 2:
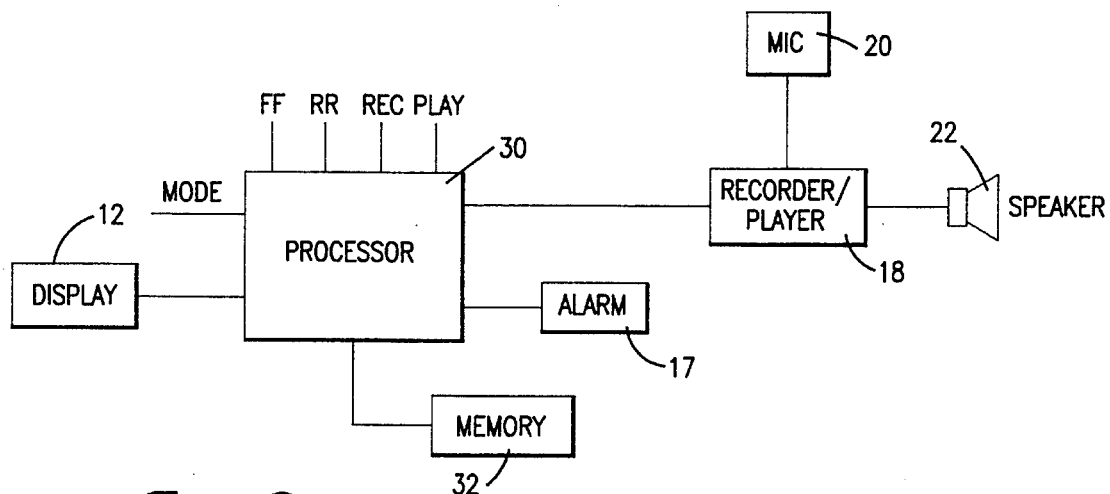
FIG. 2 is block diagram of a second preferred embodiment of the present invention.

With reference now to FIG. 2, an embodiment of the present invention which utilizes a microprocessor is shown schematically and described.

The embodiment of FIG. 2 shows a microprocessor 30 coupled to an audio storage unit 18. As describe above, storage unit 18 includes associated means for recording messages and editing recorded messages. A microphone 20 is coupled to audio storage unit 18. A speaker 22 is coupled to storage unit 18. Microprocessor 30 has memory 32. It will be appreciated that microprocessor 30 has a clock function which keeps time and sends an appropriate display signal to control and update display 12, which displays the current time. Accordingly, control lines 14, 16 by which the user sets a selected time at which an alarm is to occur and turns the alarm on (i.e., activating the alarm so that it sounds when the selected time arrives), respectively, are coupled to microprocessor 30. In the embodiment of FIG. 2, memory 32 stores software for carrying out the functions of the present invention. It should be understood that (although not specifically shown) the embodiment of FIG. 2 preferably has a volume controller, and particularly, an automatic volume controller as described in connection with reference numeral 23 of FIG. 1.

Figure 3:
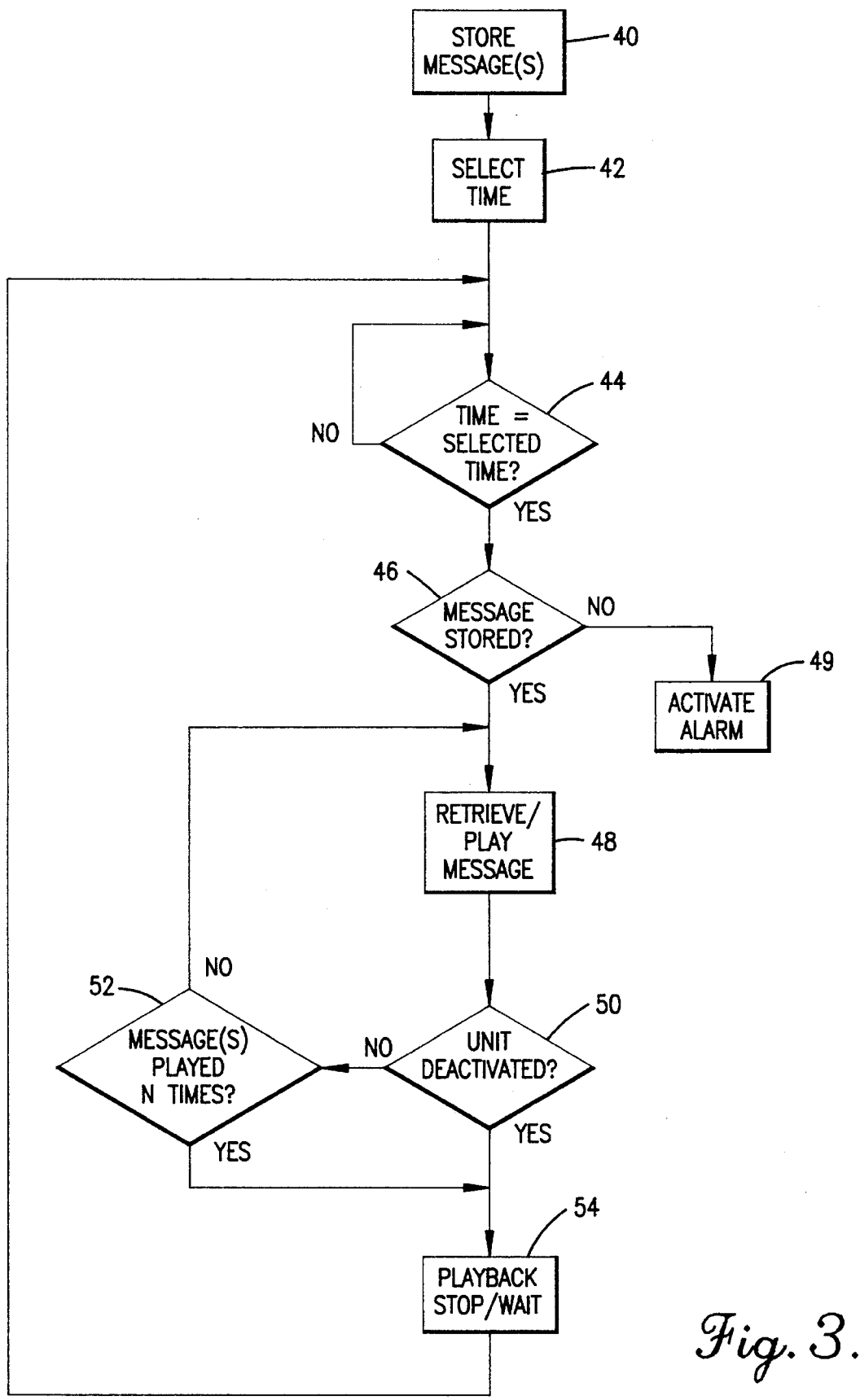
Figure 4:
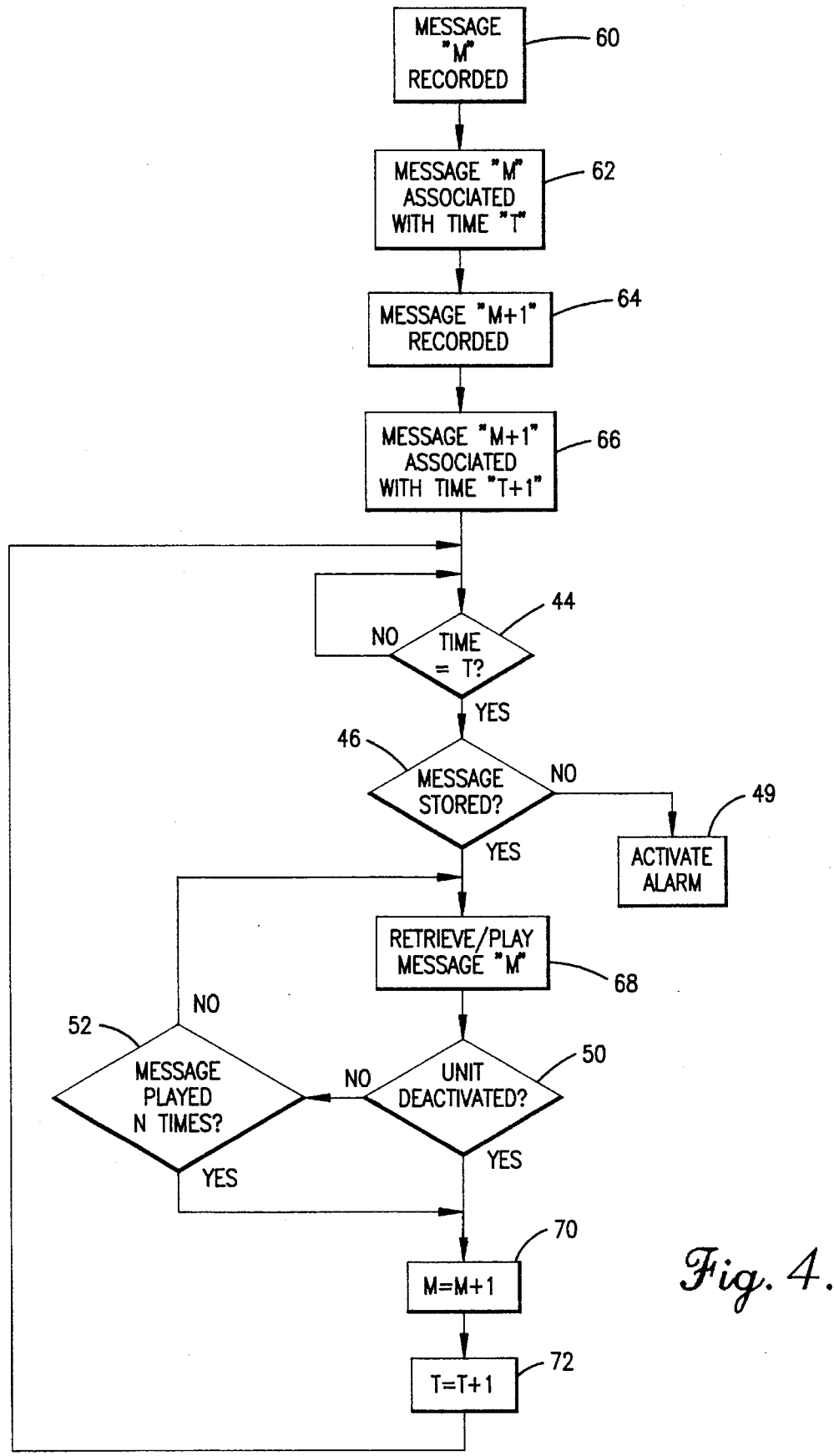

With additional reference now to the flowcharts of FIGS. 3 and 4, preferred modes of operation of the present invention are described. It will be apparent that user operation of the present invention is the same whether or not a microprocessor is employed.

At step 40 of FIG. 3, the user stores one or more audible messages in storage unit 18. This is accomplished by pressing the REC (record) button on storage unit 18 and speaking or otherwise generating messages, sounds, or tones into microphone 20. The audible message is stored in an analogue fashion (such as on cassette tape), or digitally, consistently with the type of storage unit 18 utilized. Additional messages may be stored, in sequential manner, in real time, or alternatively, a first message may be stored, and second, third, and so on, messages may be stored at later times, assuming the storage capacity of unit 18 is not filled.

At step 42, the user selects and sets the time for the recorded messages to be played and also activates the device 10 through the use of control lines 14, 16, respectively. The time selected for messages to play is designated by "T". Since multiple times may be selected in some embodiments at which times the messages are played, each such time is entered at step 40 in the illustration of FIG. 3. Steps 40, 42 are interchangeable.

Once steps 40, 42 are completed, the alarm clock of the present invention will retrieve the audible messages from storage unit 18 and output the messages through speaker 22 when the current time reaches the selected set time for an alarm to sound. Additionally, the user may retrieve and listen to the messages by pressing the PLAY button at any time.

As indicated at step 44, if the current time has not reached the first selected time T for an alarm to occur, the alarm clock remains in a waiting state. Still at logic step 44, and additionally at steps 46 and 48, when the current time reaches the preselected, set time T, stored messages, if any, are retrieved from storage unit 18 and played through speaker 22. It will be appreciated that this is accomplished in the first embodiment of FIG. 1 by the automatic closing of a switch that activates the play button. In the embodiment of FIG. 2, a signal is preferably sent from microprocessor 30 to retrieve and play the messages. As shown at step 46, if no messages are stored, a traditional alarm 17, such as a bell, buzzer, or the radio, is activated, as indicated at block 49.

With reference to the logic step 50, if the user does not deactivate the unit and if, at step 52, the messages have not played through a certain amount of times (or for a certain duration) without deactivation by the user, the message(s) will play again. If, however, the user deactivates device 10 or the messages have played through multiple times or have replayed for a certain duration (within the design of device 10), playback will stop. In other words, the messages play for a predetermined amount of time, or until the user shuts the alarm off by pressing the OFF button, which ever occurs first.

At step 54, the device 10 then awaits the next preselected time T for playback of messages and the process is repeated. Although not shown in FIG. 3, in an embodiment of the present invention comprising an alarm clock, if a snooze button is activated during message playback, the messages will be replayed at the end of the snooze time. Additionally, in accordance with preferred principles of the present invention, if more than one playback time T is selected in a 24 hour period, the device 10 does not need to be reactivated. In one embodiment, the device will automatically play any messages stored in unit 18 unless device 10 is specifically deactivated. Alternatively, device 10 may be constructed such that it must be activated in order for a message to play, and after each playback period, device 10 must again be activated in order for playback to occur at any subsequent times T or, if there is only one preselected time T, the next time that T arrives (i.e., 24 hours later).

Referring now to the flowchart of FIG. 4, a second mode of operation is described. In this second mode, separate messages or sounds are associated with different playback times. Accordingly, at step 60, a first message or sound, designated by M, is recorded and at step 62, message M is associated with a preselected time T for playback. A second message M+1 is associated with a second playback time T+2, as illustrated at steps 64, 66. Additional messages may be associated with additional playback times, as desired.

This feature is accomplished by device 10 by marking or designating the end of each message. This is preferably accomplished with the embodiment of FIG. 2 in the following manner. Assume, for example, that mode 2 is selected by the user, utilizing the MODE switch, and the user depresses the record (REC) button to record a message. By monitoring the activation and deactivation of the record button, microprocessor 30 monitors the beginning and ending of a recorded message. The parameters of the message are stored in storage unit 18. Specifically, the parameters of a first message M are stored in memory 32 at an address corresponding to an associated time T, also stored in memory. When the time T arrives, microprocessor 30 access memory 32 and activates the storage unit 18 to play only the message associated with the time T. It will be appreciated that numerous methods of electronically marking recorded messages and associating each of the marked messages with one or more selected times may be utilized.

The remaining operation of Mode 2 of FIG. 4 is similar to Mode 1 of FIG. 3, with the exception of playback. Accordingly, steps bearing the same reference numerals as steps in FIG. 3 have represent the same operation as previously described. Particularly, as indicated at what is referenced step 68, each time a message is to be played, only the message associated with that playback time is output through speaker 22. After the message plays, device 10 waits for the next preselected time T to play the next message M, as indicated by blocks 70, 72. If only one message M is stored in storage unit 18, but multiple times T are preselected, message M preferably plays at each time T. Mode 2 as described is particularly desirable for use in a handheld recorder for use as a reminder or planner. It should be understood that device 10 may be constructed so that the second, third, and additional times T merely result in the output of a buzzer, bell, or the like.

With reference now to the flowchart of FIG. 5, yet another mode of operation, called herein the interval mode, is described. In the interval mode, the user can store audio (e.g., a message) at a first selected time and then select an interval such that the message will play at the end of each interval.

At indicated at step 100 of FIG. 5, the interval mode is selected by the user utilizing the MODE switch. The storing of messages and selection of an initial playback time is not illustrated again in FIG. 5 since it will now be apparent in view of the foregoing description. Rather, it should be understood that in the present discussion, once interval mode was selected, an audio portion (e.g., a message) was stored in storage unit 18 and was associated with a selected time for playback. At the logic step 102, the user selects whether the interval is to be in hours or days. The present invention may provide software which prompts the user to make such a selection by an appropriate instruction on display 12. Preferably, the MODE switch is also utilized to make this selection whereby repeated pressing of the MODE switch toggles the display between an interval in HOURS and in DAYS. Other interval selection periods, such as months, years, etc. may be incorporated and are contemplated by the present invention. Ultimate selection of the interval may be accomplished by pressing another button, such as control button 16.

As indicated at block 104, if the user selects, at step 102, for the interval to be in hours, the MODE switch may be pressed to increment the number of hours from 1 hour to 24 hours. Other limits may be utilized. If, on the other hand, the user selects the interval to be in days, (device 10 preferably utilizing limits of 1–31 days) block 106 illustrates that the MODE button may be pressed to successively increment the number of days to the desired days. As the interval number is increased, display 12 of device 10 displays the number. As indicated at block 108, once the desired interval is reached, it may be set by pressing an appropriate button on device 10, such as control button 16. Numerous variations will be appreciated and the present specification is for illustrative, not limiting purposes.

The operation of device 10 in interval mode should be readily understood from the foregoing description. More specifically, device 10 of the present invention has a message M stored and to be played at time T. Because message M was stored in interval mode, device 10 also has an interval time I associated with message M stored in memory 32. When activated, device 10 waits for time T. When clock 11 reaches time T, message M is played. Device 10 further monitors the passage of time, and, after passage of interval time I on clock 11, message M is again played through speaker 22.

It will be appreciated that electronic calendars are well-known. Microprocessor 30 of the present invention may include an electronic calendar which permits a user to select virtually any date and time for playing a message. In this regard, the calendar may be utilized to select multiple dates and times, as in the second mode of operation described above, for playback of a message. Selecting a date and time is preferably accomplished in a similar fashion as set forth above by incrementing through the calendar by year, month, day, hour, and minute to select times.

Reference is now made to FIGS. 6–9. It will be understood that the present invention is useful for a wide variety of purposes, and is applicable to a wide variety of products.

In this regard, the principles of the present invention are shown and described in selected products.

As shown in FIG. 6, device 10 comprises an alarm clock. Alarm clock 10 has a housing 74 which contains the principle components of the present invention described above in connection with FIGS. 1 and 2. A display 12 for displaying time is visible on the face 76 of housing 74. Microphone 20 is positioned within housing 74 and is audibly accessible through housing 74 as indicated at reference numeral 78. A speaker 22 (not shown) is positioned within housing 74 in close proximity to a grate 80. Buttons 82, which are associated with functions PLAY, RR, FF, REC, MODE SELECT, STOP, VOL and other buttons 84 associated with functions SET ACTUAL TIME, SET ALARM TIME, ACTIVATE ALARM, cooperate with associated electronic circuitry of alarm clock 10 of the present invention. The buttons 82 are used to activate features of alarm clock 10 for recording and editing audio messages into storage unit 18 of the present invention. Buttons 84 are utilized to set the current time, the time for an alarm to occur (i.e., buzzer, etc. to sound or message to play), and to activate or initiate alarm clock 10 so that an alarm is to occur at the selected time.

In accordance with the preferred principles of the present invention, alarm clock 10 has a buzzer, bell, radio, or some other noise generator, denoted by reference numeral 17 as commonly found in traditional alarm clocks. If no audio messages are stored in storage unit 18, a traditional alarm (e.g., buzzer, bell, etc.) will sound. Preferably, at the option of the user, the noise generator will sound a tone for a brief period prior to any stored audio being played. This is useful for providing an indication that recorded messages will be played and is useful to first awaken a sleeping individual just prior to playback of recorded messages.

With reference now to FIG. 7, device 10 comprises a handheld recorder having a housing 74. Shown is a digital recorder, although a recorder which utilizes a microcassette positioned in a microcassette bay may be constructed. A display 12 is visible on the housing 74. A speaker 22 (not shown) is positioned within housing 74 in proximity to grate 80 such that audio data output from speaker 22 is easily heard. Recorder 10 is particularly useful as an organizer or planner, or as a device for reminding the user of selected things. For example, when used in the second mode of operation, recorder 10 is particularly useful for recording one or more messages, and associating those messages with selected times. In this way, dictated messages (perhaps for providing a reminder or motivation to the user) or timely played at times set by the user. In this embodiment, it is preferred that, if the user does not deactivate the message after or during playback, or otherwise signal to recorder 10 that the message was heard, a light 90 on the housing 74 flashes to notify the user that a message was played, and perhaps missed.

With reference now to FIG. 8, device 10 of the present invention comprises a telephone answering machine. The function and operation of telephone answering machines will be readily and generally understood by those familiar with such devices. Accordingly, only a brief discussion of answering machines is provided here. Answering machines generally contain an outgoing message (OGM) recorded by the intended recipient of telephone calls. The OGM plays when activated by an incoming call. The answering machine permits the calling party to record a message.

The present invention, which unlike traditional answering machines only permit messages to be played by user activation of a PLAYBACK feature, permits the user to preselect a time at which any recorded messages are automatically played. The present invention has an automatic volume adjuster, so that the volume, despite being reduced to a minimum by the user to prevent disturbance caused by incoming calls, is increased just prior to automatic message playback. In a variation of this feature, the answering machine of the present invention is equipped with a do not disturb (DND) feature. This feature permits the answering machine to record incoming messages, but does not output the messages as they are incoming. However, upon playback, the DND feature is automatically deactivated so that the messages are heard. This is accomplished either by volume control, or alternatively, by a switching mechanism, which maintains the speaker in an open circuit during the DND state, but which closes a switch, to place the speaker in an electrical current loop for the playback of messages.

As shown in FIG. 8, device 10 has a cassette 88 positioned in a bay. Device 10 may recorded messages digitally. Buttons are provided for controlling the device 10. Telephone cords 86 are shown.

With reference now to FIG. 9, a slight variation of the present invention is shown, wherein device 10 comprises a timer. It will be appreciated that generally the same components and principles are utilized in timer 10 as in the other embodiments, with one primary exception. Timer 10 utilizes a timer, rather than a clock, for keeping track of elapsed time. Timers are well-known, and may be analogue or digital. In traditional timers, a preselected amount of time is set on the timer, and once activated, the timer will provide an indication when the set amount of time has lapsed. In accordance with the principles of the present invention, that indication includes audible data recorded and stored into an internal storage unit 18 (not shown in FIG. 6) and output through a speaker 22 (not shown in FIG. 6).

It is seen that numerous possible variations and modifications of the present invention may be employed. For instance, device 10 may utilized voice activated technology such that the preselected times at which a message is to sound are entered into the device by the user by speaking into the microphone.

Accordingly, from the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A device comprising:

a clock for keeping time;

a means for setting a selected time;

a recorder/player for recording audio and for playing audio recorded therein;

an audible alarm;

a controller, responsive to a condition of said recorder/player, for activating said recorder/player at said selected time when said recorder/player has audio recorded therein;

said controller first activates said audible alarm for a period of time, and then activates said recorder/player to thereby play said recorded audio.

2. The device as set forth in claim 1 further comprising an audible alarm, wherein said controller activates said audible alarm at said selected time when said recorder/player does not have audio recorded therein, to thereby output an audible alarm.

3. A device comprising:

a clock for keeping time;

a controller for selecting a time at which a signal is to be generated;

an alarm;

a recorder/player for recording audio and for playing audio recorded therein, wherein said signal activates said recorder/player at said selected time when said recorder/player has audio stored therein, to thereby play said audio, and said signal activates said alarm at said selected time when said recorder/player does not have audio stored therein, to thereby output an alarm.

4. The device as set forth in claim 2, further comprising:

a housing for housing said clock, said audible alarm, said recorder/player, and said controller;

a microphone connected to said recorder/player; and a record button, accessible at the exterior of said housing, for operating said recorder/player and said microphone, whereupon said recorder/player is operable to record sounds input into said microphone.

5. The device as set forth in claim 4 further comprising a display, located on said housing, for displaying the time kept by said clock.

6. The device as set forth in claim 5 wherein said recorder/player is adapted to record/play digital data.

7. The device as set forth in claim 5 wherein said recorder/player is adapted to record/play analogue data.

8. The device as set forth in claim 3 in combination with a device for receiving audible messages transmitted through a communications network, wherein said recorder/player records audible messages received through said communications network.

9. The device as set forth in claim 1 wherein a selected message is recorded in said recorder and said controller includes a programmer for programming a selected interval of time, wherein said selected message is played upon each lapse of said time interval.

10. The device as set forth in claim 3 wherein said recorder/player, when activated, repeatedly replays audio stored therein a set number of times or until said recorder/player is deactivated, whichever occurs first.

11. A device comprising:

a clock for keeping time;

a recorder/player for recording audio and for playing said recorded audio, wherein a selected message is recorded in said recorder; and a controller for setting a selected time and for programming a selected interval of time, wherein said controller is operable to initially activate said recorder/player at said selected time and to subsequently activate said recorder/player upon each lapse of said time interval, to thereby initially and subsequently output said selected message.

12. The device as set forth in claim 11 wherein said selected message is stored at a defined location in said recorder/player and wherein said recorder/player is operable to store other audio and said controller is operable for controlling said recorder/player to play said other audio at times other than upon the lapse of each said time interval.

* * * * *